US008243680B2

(12) United States Patent
Jung et al.

(10) Patent No.: US 8,243,680 B2
(45) Date of Patent: Aug. 14, 2012

(54) TRAFFIC TRANSMISSION PATH RELOCATION METHOD FOR RADIO COMMUNICATION SYSTEM

(75) Inventors: Myung-Cheul Jung, Seoul (KR); Young-Dae Lee, Gyeonggi-Do (KR); Sung-Jun Park, Gyeonggi-Do (KR); Sung-Duck Chun, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 855 days.

(21) Appl. No.: 12/064,455

(22) PCT Filed: Aug. 24, 2006

(86) PCT No.: PCT/KR2006/003340
§ 371 (c)(1),
(2), (4) Date: Feb. 21, 2008

(87) PCT Pub. No.: WO2007/024112
PCT Pub. Date: Mar. 1, 2007

(65) Prior Publication Data
US 2008/0247361 A1    Oct. 9, 2008

Related U.S. Application Data

(60) Provisional application No. 60/711,536, filed on Aug. 25, 2005.

(30) Foreign Application Priority Data

Jul. 7, 2006 (KR) .......................... 10-2006-0064115

(51) Int. Cl.
*H04W 4/00* (2009.01)
*H04W 36/00* (2009.01)
(52) U.S. Cl. ........................................ 370/331; 455/436

(58) Field of Classification Search ................. 370/229, 370/230, 237, 238, 351–358, 387, 310.2, 370/328, 331–334; 455/421, 422.1, 432.1, 455/432.3, 433, 436–443, 560
See application file for complete search history.

(56) References Cited

U.S. PATENT DOCUMENTS 6,968,190 B1 * 11/2005 Suumaki et al. .............. 455/436
(Continued)

FOREIGN PATENT DOCUMENTS
JP    2002-291015    10/2002
(Continued)

OTHER PUBLICATIONS

"TSG-RAN Working Group 3 Meeting #7: Sequence charts for UMTS to GPRS cell reselection". TSGR3#7(99)C64. Sophia Antipolis, France Sep. 20-24, 1999.*

(Continued)

*Primary Examiner* — Ian N Moore
*Assistant Examiner* — Afshawn Towfighi
(74) *Attorney, Agent, or Firm* — Lee, Hong, Degerman, Kang & Waimey

(57) ABSTRACT

A method for effectively relocating a traffic transmission path when a mobile terminal changes a gateway for a traffic transmission that may include: when a mobile terminal performs handover from a first radio network node to a second radio network node, determining a gateway for processing traffic most suitable for the second radio network node; changing a traffic transmission path to the determined gateway; and transmitting, by a traffic transmission node, traffic to the second radio network node through the changed traffic transmission path.

9 Claims, 5 Drawing Sheets

U.S. PATENT DOCUMENTS

| | | | |
|---|---|---|---|
| 2002/0049059 A1* | 4/2002 | Soininen et al. | 455/439 |
| 2002/0064144 A1* | 5/2002 | Einola et al. | 370/335 |
| 2002/0072363 A1* | 6/2002 | Riihinen et al. | 455/432 |
| 2002/0114293 A1* | 8/2002 | Madour et al. | 370/329 |
| 2002/0131396 A1* | 9/2002 | Knuutila et al. | 370/349 |
| 2002/0137515 A1* | 9/2002 | Igarashi et al. | 455/436 |
| 2003/0003919 A1 | 1/2003 | Beming et al. | |
| 2003/0013446 A1* | 1/2003 | Haumont et al. | 455/436 |
| 2003/0169725 A1* | 9/2003 | Ahmavaara et al. | 370/352 |
| 2004/0017798 A1* | 1/2004 | Hurtta et al. | 370/352 |
| 2004/0029614 A1* | 2/2004 | Back et al. | 455/560 |
| 2004/0063431 A1* | 4/2004 | Julka et al. | 455/436 |
| 2004/0139224 A1* | 7/2004 | Nishimura et al. | 709/238 |
| 2004/0157651 A1* | 8/2004 | Duncan Ho et al. | 455/574 |
| 2004/0203754 A1 | 10/2004 | Yi-Bing et al. | |
| 2004/0213181 A1* | 10/2004 | Grech et al. | 370/331 |
| 2004/0243720 A1* | 12/2004 | Haumont et al. | 709/245 |
| 2005/0201330 A1* | 9/2005 | Park et al. | 370/331 |
| 2006/0099972 A1* | 5/2006 | Nair et al. | 455/458 |
| 2006/0291416 A1* | 12/2006 | Rexhepi et al. | 370/331 |
| 2007/0021120 A1* | 1/2007 | Flore et al. | 455/436 |

FOREIGN PATENT DOCUMENTS

| | | |
|---|---|---|
| JP | 2003-338832 | 11/2003 |
| JP | 2005-051767 | 2/2005 |
| RU | 2303335 | 7/2007 |
| TW | I225375 | 12/2004 |
| WO | WO01-76282 | 10/2001 |

OTHER PUBLICATIONS

3GPP TR 25.936 V4.0.1. (Dec. 2001): 3rd Generation Partnership Project (3GPP); Technical Specification Group (TSG) RAN 3; Handovers for real-time services from PS domain (Release 4) Jan. 9, 2002.

J. Kong et al., "A Secure Ad-Hoc Routing Approach Using Localized Self-Healing Communities," Proceedings of the 6th ACM International Symposium on Mobile Ad Hoc Networking and Computing, pp. 254-265, May 2005.

NTT DoCoMo Inc., "DoCoMo's View on 3G Evolution and Requirements," REV-WS005, TSG-RAN Future Evolution Workshop, Nov. 2004.

\* cited by examiner

[Fig. 1]
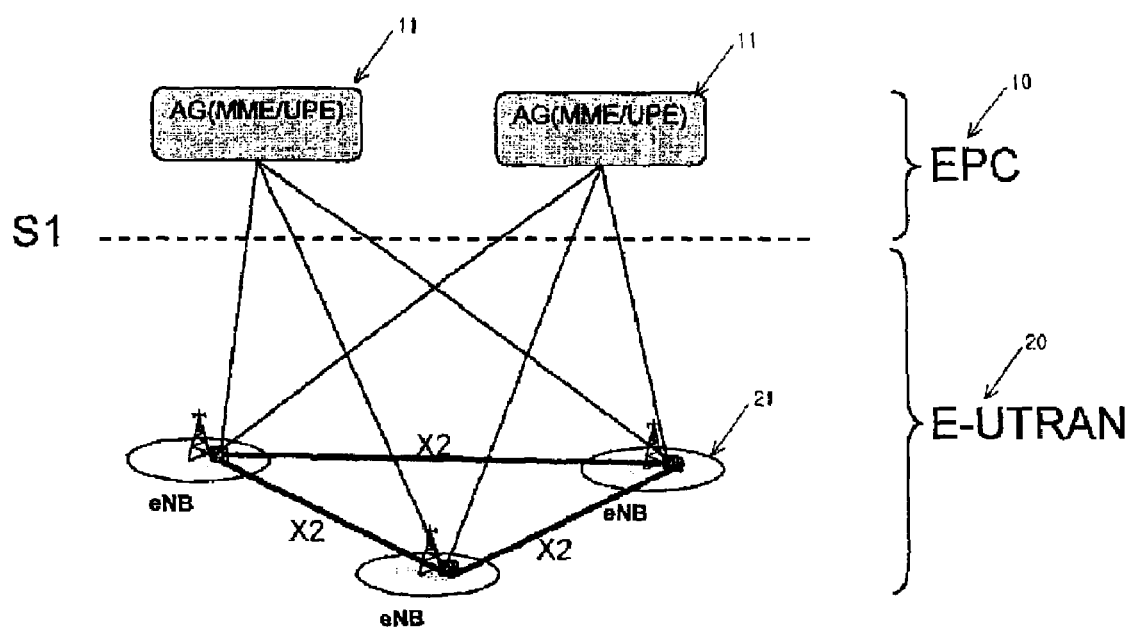
[Fig. 2]
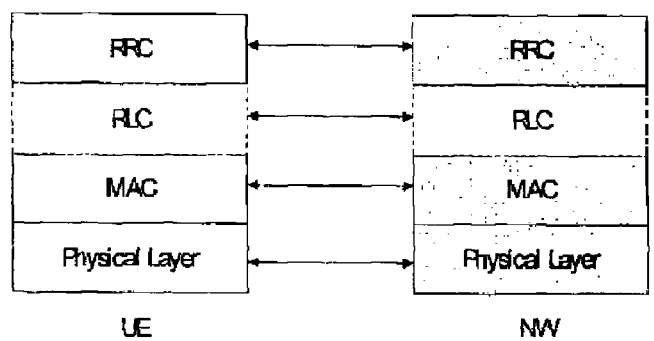
[Fig. 3]
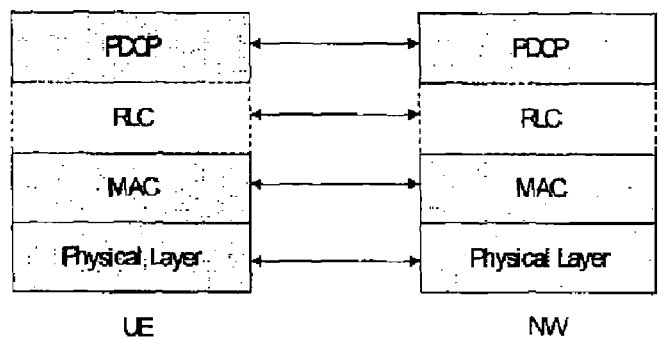

[Fig. 4]
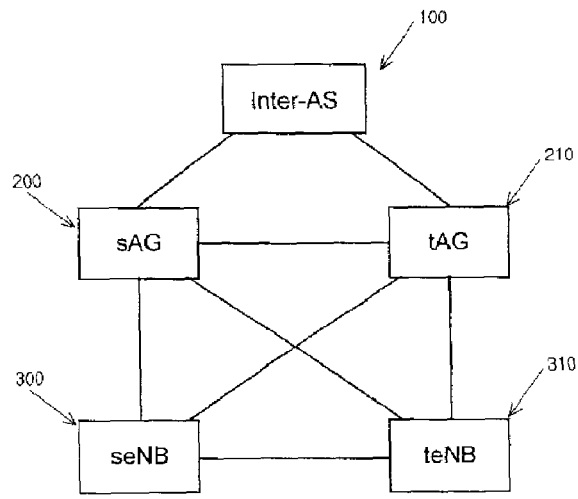
[Fig. 5]
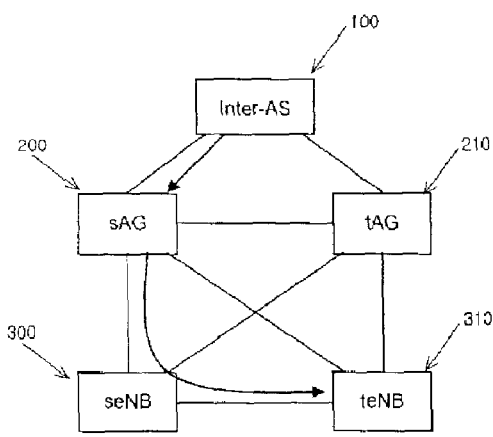
[Fig. 6]
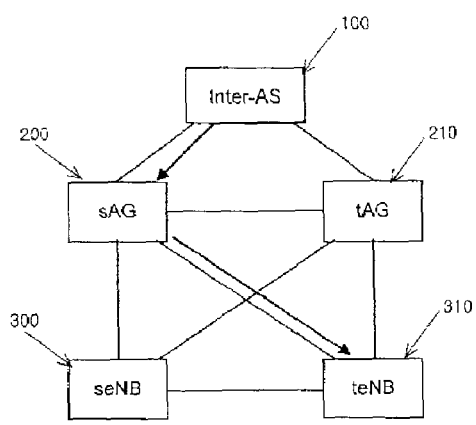

[Fig. 7]
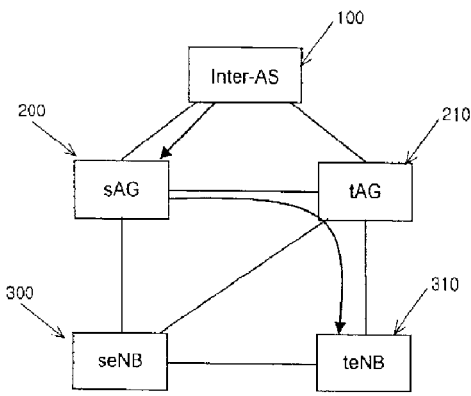
[Fig. 8]
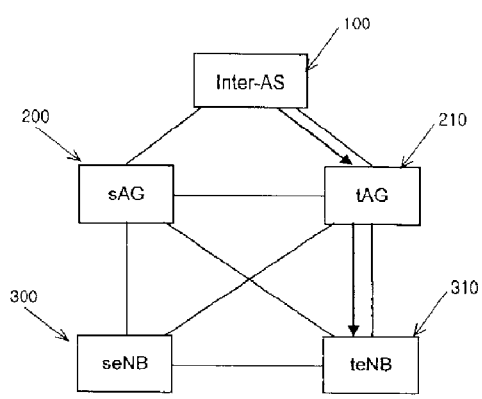
[Fig. 9]
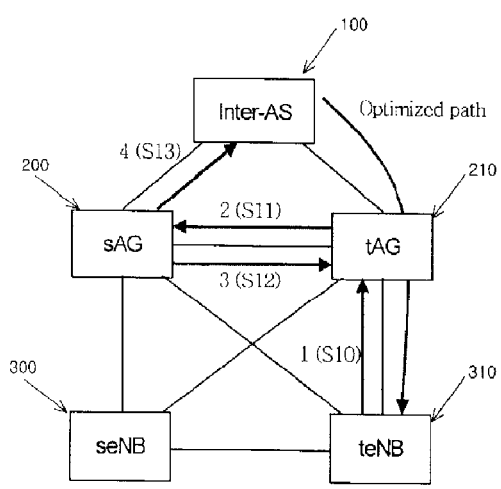

[Fig. 10]
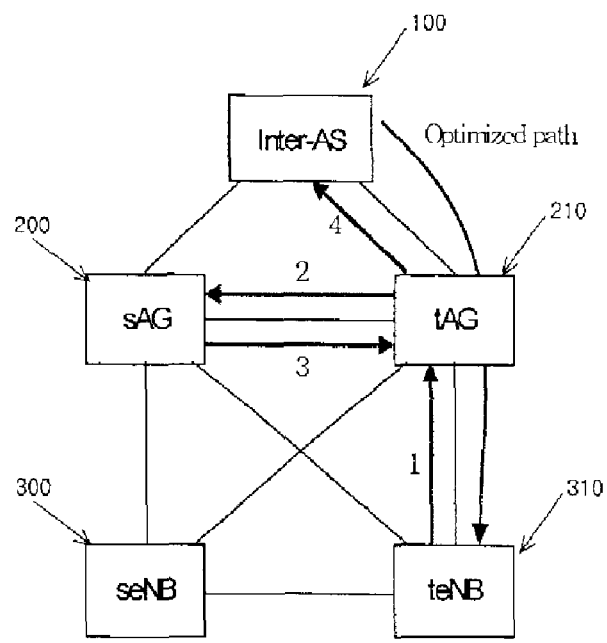
[Fig. 11]
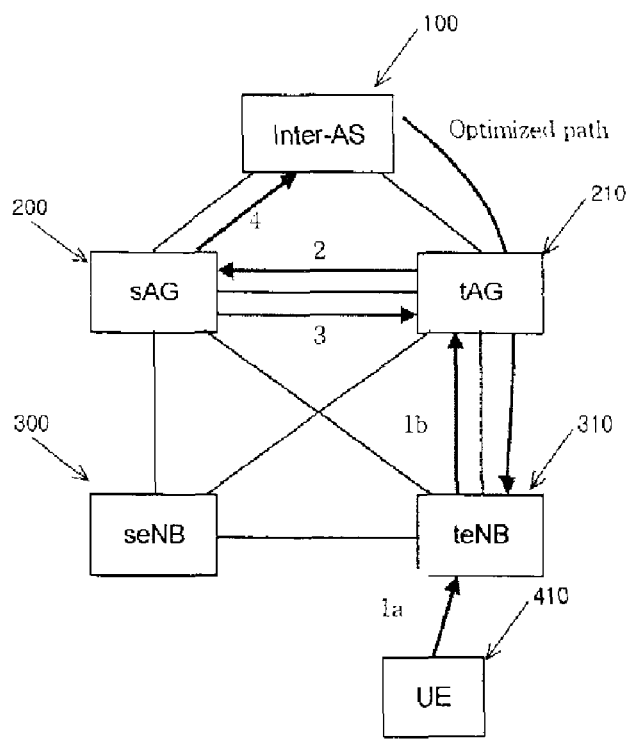

[Fig. 12]
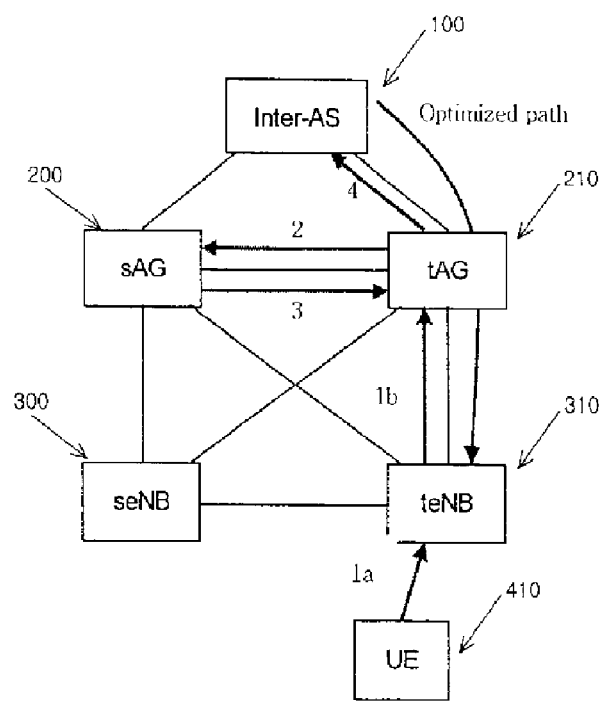
[Fig. 13]
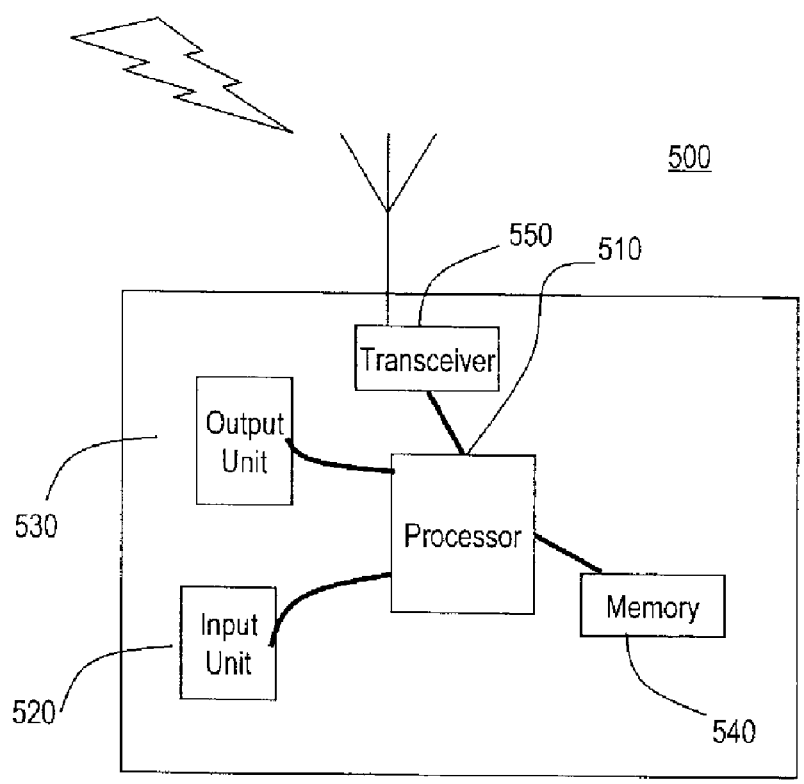

TRAFFIC TRANSMISSION PATH RELOCATION METHOD FOR RADIO COMMUNICATION SYSTEM

CROSS-REFERENCE TO RELATED APPLICATIONS

This application is the National Stage filing under 35 U.S.C. 371 of International Application No. PCT/KR2006/003340, filed on Aug. 24, 2006, and claims the benefit of earlier filing date and right of priority to Korean Patent Application No. 10-2006-0064115, filed on Jul. 7, 2006, and also claims the benefit of U.S. Provisional Application No. 60/711,536, filed on Aug. 25, 2005.

TECHNICAL FIELD

The present invention relates to an E-UMTS (Evolved Universal Mobile Telecommunications System) and, more particularly, to a method for effectively relocating a traffic transmission path when a mobile terminal changes a gateway for traffic transmission.

BACKGROUND ART

FIG. 1 is a network structure of the E-UMTS, a mobile communication system applicable to the related art and the present invention.

The E-UMTS system has been evolved from the UMTS system, for which the 3GPP is proceeding with the preparation of the basic specifications applicable thereto. The E-UMTS system can be classified as an LTE (Long Term Evolution) system.

With reference to FIG. 1, the E-UMTS network is divided into an E-UTRAN 20 and an EPC (Evolved Packet Core) 10. The E-UTRAN 20 includes a terminal (UE (User Equipment)), a base station (eNB or eNode B) 21 and an AG (Access Gateway) 11 (which also can be expressed as 'MME/UPE'). The AG 11 can be divided into a part for handling user traffic and a part for handling control traffic. The AG part for handling new user traffic and the AG part for handling control traffic can communicate with each other via newly defined interface.

One or more cells may exist in a single eNode B (eNB) 21, and an interface for transmitting the user traffic and the control traffic can be used between the eNode Bs.

The EPC 10 may include an AG 11, a node for user registration of the UE, and the like. Also, in the UMTS of FIG. 1, an interface for discriminating the E-UTRAN 20 and the EPC 10 can be used. An S1 interface can connect a plurality of nodes (i.e., in a many-to-many manner) between the eNode B 21 and the AG 11. The eNode Bs are connected with each other through an X2 interface, and the X2 interface is always present between adjacent eNode Bs in a meshed network structure.

Layers of a radio interface protocol between the UE and a network can be divided into a first layer (L1), a second layer (L2) and a third layer (L3) based upon the three lower layers of an open system interconnection (OSI) standard model that is well-known in the art of communication systems.

The first layer (L1) provides an information transfer service using a physical channel, and a radio resource control (RRC) layer positioned at the third layer (L3) serves to control radio resources between the terminal and the network, for which the RRC layer exchanges an RRC message between the terminal and the network. The RRC layer can be distributed so as to be positioned in network nodes such as the eNode Bs and the AGs, etc., or can be positioned only in the eNode Bs or in the AGs.

FIG. 2 illustrates a control plane structure of the radio access interface protocol between the terminal and the UTRAN based upon various 3GPP wireless access network standards.

The radio access interface protocol has horizontal layers including a physical layer, a data link layer and a network layer, and has vertical planes including a user plane for transmitting data information and a control plane for transmitting control signals.

The protocol layers can be divided into a first layer (L1), a second layer (L2) and a third layer (L3) based upon the three lower layers of an open system interconnection (OSI) standard model that is well-known in the art of communication systems. Each layer of the control plane of the radio protocol in FIG. 2 and the user plane of the radio protocol in FIG. 3 will now be described.

The physical layer, the first layer, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the second layer provides a service to a radio link control (RLC) layer, an upper layer, via a logical channel. The RLC layer of the second layer reliably supports a data transmission. The function of the RLC layer can be implemented as a function block within the MAC layer, and in this case, the RLC layer may not be present. A PDCP layer of the second layer performs a header compression function for reducing unnecessary control information so that data transmitted by using IP packets such as IPv4 or IPv6 can be effectively transmitted via a radio interface with a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

Downlink transport channels for transmitting data from the network to the terminal, include a broadcast channel (BCH) for transmitting system information and a downlink shared channel (SCH) for transmitting the user traffic or the control message. Downlink multicast, traffic of a broadcast service or a control message can be transmitted through the downlink SCH or through a separate downlink multicast channel (MCH).

Uplink transport channels for transmitting data from the terminal to the network include a random access channel (RACH) for transmitting an initial control message and an uplink SCH for transmitting the user traffic and the control message.

DISCLOSURE OF INVENTION

Technical Problem

In the related art, when a mobile terminal cannot be connected with a gateway (i.e., AG) for traffic transmission, the mobile terminal is currently connected to use because of its mobility any longer or when the gateway cannot be sustained in terms of other operations, the mobile terminal changes its connection to a gateway suitable for a base station into which it has been moved.

In this respect, however, the change to the new gateway increases traffic congestion of a network because of context information exchanged between the gateways and signaling message transmissions between many base stations and gateways, and the like.

Technical Solution

One exemplary feature of the present invention is to provide a method for relocating a traffic transmission path of a mobile terminal capable of optimizing transmission of a signaling message to thus minimize congestion of a network when a mobile terminal changes a gateway for traffic transmission.

To implement at least the above feature in whole or in parts, the present invention provides a method for relocating a traffic transmission path in a mobile communication system that may include: when a mobile terminal performs handover from a first radio network node to a second radio network node, determining a gateway for processing traffic most suitable for the second radio network node; changing a traffic transmission path to the determined gateway; and transmitting, by a traffic transmission node, traffic to the second radio network node through the changed traffic transmission path.

The first radio network node may be a base station to which the mobile terminal is currently connected to receive a service, and the second radio network node may be a base station to which the mobile terminal is to move to receive a service.

In the traffic transmission path relocation method, the traffic transmission path changing step includes: transmitting by the second radio network node, a relocation request message to the determined first gateway; transmitting, by the first gateway which has received the relocation request message, a path optimization request message to a gateway from which the terminal had previously received a service; and transmitting, by the second gateway, a response message to the first gateway and informing a traffic transmission node within a network that the traffic path has been changed.

The relocation request message may include context information of the terminal such as authentication information of the mobile terminal, security information and compression related information.

The path optimization request message may include the context information and identification information of the terminal.

The first gateway registers the terminal on a terminal list of the first gateway itself manages according to the response message and the second gateway may delete the context information with respect to the terminal and also delete the terminal from a terminal list managed by itself.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 shows an exemplary network structure of an E-UMTS, a mobile communication system for which a related art and the mobile terminal are applied;

FIG. 2 is an exemplary structure of a control plane of a radio interface protocol between a terminal and a UTRAN based on a 3GPP wireless access network specification;

FIG. 3 is an exemplary structure of a user plane of the radio interface protocol between the terminal and the UTRAN based on the 3GPP wireless access network specification;

FIG. 4 shows an exemplary network structure model for explaining a relocation method according to the present invention, namely, a basic network configuration related to AG relocation;

FIG. 5 shows an example of traffic (e.g., packet) transmission between eNBs when a terminal moves from a seNB to a teNB;

FIG. 6 is a view showing traffic transmission from a sAG to a teNB when the terminal moves from the seNB to the teNB.

FIG. 7 shows a traffic transmission when the terminal moves from an seNB to the teNB but there is no path between the sAG and the teNB;

FIG. 8 shows an example of relocating an optimum AG to the teNB and transmitting traffic, when the terminal moves from the seNB to the teNB;

FIG. 9 shows a method for relocating a packet transmission path according to the present invention;

FIG. 10 shows a method for relocating a packet transmission path by an AG relocation request through a late path switching;

FIG. 11 and FIG. 12 show the AG relocation process through the terminal.

FIG. 13 is an exemplary structure of a mobile communications terminal according to the present invention.

MODE FOR THE INVENTION

One aspect of the present invention relates to the recognition by the present inventors about the problems of the related art as described above, and further explained hereafter. Based upon this recognition, the features of the present invention have been developed.

Although the present invention is shown to be implemented in a mobile communication system, such as a UMTS developed under 3GPP specifications, the present invention can also be applied to other communication systems operating in conformity with different standards and specifications.

As network technology continues to develop, it is foreseen that RNCs may no longer be necessary in future networks, because Node Bs with enhanced capabilities, or other types of network entities (e.g. so-called Access Gateways) may handle the operations performed by currently existing RNCs. Such long-term evolution issues further support the need to develop improved radio admission control techniques to be used in admitting new terminals (or establishing new user links) and supporting newly developing enhanced services for a greater number of terminals being managed by the network.

The present invention provides a traffic transmission path relocation method capable of minimizing traffic congestion of a network and minimizing an unnecessary signaling process when a mobile terminal wants to change an access gateway (AG) of a radio network, with which the mobile terminal is currently connected due to the mobility of the radio terminal.

Namely, when the mobile terminal changes its connection from a first radio network node, with which the mobile terminal is currently connected with, to a second radio network node, the wireless communication system changes or newly sets a gateway node for processing traffic most suitable for the second radio network node, to thus optimize transmission efficiency.

Preferably, the first radio network node may be a base station node source eNB with which the mobile terminal is currently connected to receive a service, and the second radio network node may be a base station node target eNB to which the mobile terminal is going to move to receive a service.

FIG. 4 shows an exemplary network structure model for explaining an exemplary relocation method according to the present invention, namely, a basic network configuration related to AG relocation.

With reference to FIG. 4, an Inter-Autonomous System (inter-AS) 100 is a higher level network node, and a service to be transmitted to the terminal is transmitted to AGs (sAG 200 and tAG 210) via the Inter-AS (e.g., a traffic transmission node) 100. The Inter-As 100 can serve as an anchor for interworking with a different network. Alternatively, a network node that is located at a higher level than the AGs and serves as the anchor for interworking with a different network can act as the Inter-AS 100. The AGs are connected with each other directly or indirectly. Namely, two AGs may be connected together with or without other network nodes therebetween.

The sAG (source AG) 200 is an AG with which the terminal is being currently connected to receive a service. The sAG 200 may have information related to the terminal. The terminal-related information may include authentication information, security information, compression-related information, service information and TA (Tracking Area) information, etc. The sAG 200 includes a PDCP, a security-related protocol, and compression-related protocols with respect to the terminal.

The tAG (target AG) 210 is an AG to which the terminal is going to move after moving to a teNB 300, and the seNB 310 is a base station node with which the terminal has been connected to receive the service. The terminal is allocated radio resources via the base station and receives traffic through a radio interface. If the terminal wants to move from the seNB 300 to the teNB 310, it is disconnected from the seNB 300 and is newly connected with the teNB 310 (namely, it cuts off its connection with the seNB and makes a new connection with the teNB). In this case, the teNB basically has an interface (X2) connected with the seNB 300, through which a packet transmission can be performed between the eNBs. One eNB can perform packet transmission on several AGs through an interface (S1).

FIG. 5 shows an example of traffic (e.g., packet) transmission between the eNBs when the terminal moves from the seNB 300 to the teNB 310. As shown in FIG. 5, when the terminal moves from the seNB 300 to the teNB 310, a packet transmission is performed between the seNB 300 and the teNB 310 until when handover is completed, as the teNB 310 receives handover completion information after the seNB 300 transmits a handover command to the terminal.

FIG. 6 is a view showing traffic transmission from the sAG 200 to the teNB 310 when the terminal moves from the seNB 300 to the teNB 310. FIG. 6 shows a case where when the terminal, upon completion of handover, moves to the teNB 310, a path from the sAG 200 is updated so that traffic can be transmitted directly to the teNB, not to the seNB.

FIG. 7 shows a traffic transmission when the terminal moves from the seNB 300 to the teNB 310, but there is no path between the sAG 200 and the teNB 310. In FIG. 7, when the terminal moves from the seNB 300 to the teNB 310, but an immediate connection is not possible because there is no path from the sAG 200 directly to the teNB 310 or due to other problems, traffic transmission should be made via the tAG 210 to which the teNB 310 can be connected.

In the cases as shown in FIGS. 6 and 7, because traffic may be transmitted to the terminal via another path than an optimum path, additional traffic transmission delays may occurs. Also, a problem may arise with respect to the traffic transmission according to a traffic load or capacity of the sAG, etc.

Thus, as shown in FIG. 8, a gateway (namely, 'tAG') that is most suitable for the eNB to which the terminal is being connected with, should be relocated to transmit traffic via an optimized path.

FIG. 8 shows an example of relocating an optimum AG to the teNB 310 and transmitting traffic, when the terminal moves from the seNB 300 to the teNB 310.

FIG. 9 shows a method for optimizing a packet transmission path via an AG relocation, and particularly, shows a method for relocating the AG in the process of traffic transmission as shown in FIGS. 6 and 7.

With reference to FIG. 9, the terminal is in a state of receiving or transmitting traffic in an active mode. When handover is being performed as the terminal moves from the seNB to the teNB, the terminal receives traffic through the seNB (FIG. 5: Inter AS (100)->sAG (200)->seNB (300)->teNB (310)->terminal).

When handover is completed, the terminal may receive traffic directly from the teNB through the sAG (FIG. 6: Inter AG (100)->sAG (200)->teNB (310)->terminal), or may receive traffic through the tAG, namely, a new AG (FIG. 7: Inter AS (100)->sAG (200)->tAG (210)->teNB (310)->terminal).

Accordingly, first, the teNB 310 may check an activity of the terminal, namely, a state of traffic transmission or reception. In this case, the terminal may be in an active mode in which it transmits or receives traffic or in a quasi-active mode in which it is in an active state but transmits or receives little traffic or does not transmit or receive any traffic. The quasi-active mode is similar to an idle mode, but different from the idle mode in that the terminal is present and sustained in the eNB to which UE context of the terminal is connected. Herein, it is assumed that the terminal, which has transmitted and received traffic in the active mode, has been changed to be in the quasi-active mode as the traffic transmission and reception is suspended. When the terminal is checked to be in the quasi-active mode, the teNB 310 determines the most valid AG (e.g., the tAG) (which can be determined in terms of an operator in consideration of characteristics such as traffic path optimization, a traffic load and a user load, etc.) and transmits an AG relocation request message to the tAG 210 (step S10).

The AG relocation request message may include UE context or the like with respect to the terminal. The UE context information may include authentication information, security information and compression-related information. Additional UE context information, as well as other types of information may be included in the AG relocation request message. In this case, the terminal may be changed to the idle mode or can be maintained in the quasi-active mode. For this purpose, the teNB 310 may transmit a request message for changing or maintaining the terminal state to the terminal.

When the tAG 210 receives the AG relocation request message from the teNB 310, it transmits an AG path optimization request message to the sAG (step S11). In this case, the AG path optimization message may include the UE context information and identification information, or may include the authentication information and the security information as necessary.

Upon receiving the AG path optimization request message, the sAG 200 may transmit an AG path optimization response message containing the context information such as the authentication information and the security information with respect to the terminal to the tAG (step S12). As the tAG 210 receives the AG path optimization response message, it may register or attach the terminal into its terminal list (which is managed by the tAG itself). The sAG 200 may delete or detach the context information with respect to the terminal or de-list the terminal from its terminal list that manages it. Or, the sAG may keep a portion or the entirety of the UE context information.

The sAG 200 requests the Inter-AS 100 or a server related to distribution of traffic or providing of a service within the network to change the path for a traffic transmission from the terminal to the tAG 210, instead of to the sAG 200, through a path switching message (step S13).

Upon receiving the path switching message, the Inter-AS 100 may check the traffic situation such as (a traffic load, etc), switches the traffic transmission path with respect to the service, and starts traffic transmission for the terminal through the tAG 210, instead of through the sAG 200. Accordingly, the traffic is directly transmitted to the teNB 310 from the Inter-AS 100 via the tAG 210 so as to be provided to the terminal through an optimized path. Also, the traffic transmission path may change when the traffic load condition is substantially changed (i.e., when the traffic load is greater than predetermined threshold value) again even after the traffic transmission path has been previously established.

An AG relocation request through a late path switching will be described in detail with reference to FIG. 10.

The basic assumptions and processes in FIG. 10 follow the processes of FIG. 9.

Namely, a first step and a second step of FIG. 9 are performed same in FIG. 10. In a third step, the tAG 210 may receive the AG path optimization response message and confirms the AG path optimization request. In a fourth step, the tAG 210 may transmit the path switching message to the Inter-AS 100 following the reception of the AG path optimization request. Upon receiving the path switching message, the Inter-AS 100 may check the traffic situation (such as the traffic load, etc.), may switch the traffic transmission path with respect to the service and starts traffic transmission for the terminal via the tAG 210, not via the sAG 200. Accordingly, the traffic may be transmitted to the tAG 210 via the Inter-AS 100 and then immediately transmitted to the teNB 310, thereby being provided to the terminal via an optimized path.

FIGS. 11 and 12 show the AG relocation process through the terminal.

In FIGS. 11 and 12, the terminal (UE) 410 has been moved from the seNB 300 to the teNB 310 and receives network-related information or system information via the teNB 310. The network-related information may include an identifier for identifying an area or a node, etc. managed by the network. Because the terminal has been moved from a network (of which it originally belongs) to a different network, it is presently located in the different network so the identifier included in the received network-related information is different from the previous identifier. Upon checking the identifier, the terminal transmits an AG relocation request message to the teNB in order to inform the network (teNB) that it has newly moved into the network and thus requires setting of a new path. When the teNB 310 receives the AG relocation request message, it transmits the AG relocation request message to the tAG 210 to inform that the terminal registration and AG relocation are necessary.

Upon receiving the AG relocation request message, the tAG 210 transmits the AG path optimization request message to the sAG 200. Upon receiving the AG path optimization request message from the tAG 210, the sAG 200 transmits a response to the AG path optimization request message to the tAG 210.

In FIG. 11, after the sAG 200 receives the AG path optimization request message, it transmits the path switching message to the Inter-AS 100. In FIG. 12, after the tAG 210 receives the response to the AG path optimization request message from the sAG 200, it transmits the path switching message to the Inter-AS 100.

As so far described, when the mobile terminal 410 is connected to the second radio network node (teNB) 310 in a state that it had been connected with the first radio network node (seNB) 300, the gateway most suitable for the second radio network node is relocated to perform traffic transmission through an optimized path, whereby the congestion within the network and unnecessary signaling process generated in the related art can be reduced.

FIG. 13 is an exemplary construction view showing a mobile communications terminal according to the present invention.

As shown, the mobile communications terminal 500 may comprises a transceiver 550 for transmitting and/or receiving data through a traffic path in a mobile communication system via a wireless link (Wi-Fi, Wi-MAX, Wi-bro, etc.) and the like; a storage unit 540 for storing the data transmitted or received via the transceiver or from an external source; a processor 510 for sending a request for an optimized traffic path, during or after performing handover from a source node B to a target node B, to the network that determines the optimized traffic path, and receiving the data through the optimized traffic path from the network.

As can be understood, other components exist within a mobile communications terminal, but such will not be discussed in detail to prevent the characteristics of the present invention from being obscured.

The present invention provides a method for relocating an access gateway (AG) in a mobile communications system having network entities and at least one terminal, the method comprising: sending a relocation request from a target Node B (e.g., teNB) to a target access gateway; sending a path optimization request from the target access gateway to a source access gateway; sending a path switching request from at least one of the target access gateway and the source access gateway to a higher entity; establishing, by the higher entity, a optimized path to transfer data between the terminal and the higher entity; re-establishing the optimized path when the traffic load condition is substantially changed; sending, by the target node B, network related information and/or system information to the terminal, and the network related information includes an identifier to define a domain and/or a node managed by a network; sending a request to the terminal for changing or maintaining a terminal state; sending a response for the path optimization request from the source access gateway to the target access gateway; adding a terminal into a list of the target access gateway based on the response received by the target access gateway, and/or removing a terminal from a list of the source access gateway based on the response received by the target access gateway; wherein the relocation request is an AG relocation request message, the path optimization request is an AG path optimization request message, and the path switching response is an AG path switching message; wherein the higher entity (e.g., higher node, Inter-AS) determines the optimized path based upon a traffic load condition, which is determined by at least one of a traffic overload situation, a user overload situation and a capacity of the access gateways; wherein at least one of the source access gateway and the target access gateway includes information about the terminal related to at least one of authentication information, security information, compression-related information, service information, and Tracking Area (TA) information; wherein the steps are performed if the terminal is in Quasi-active mode; wherein the relocation request includes information about the terminal related to at least one of authentication information, security information, compression-related information, service information, and Tracking Area (TA) information; wherein the path optimization request includes at least one of a terminal context, identification information, authentication information and security information.

Also, the present invention provides a method for relocating an access gateway (AG) in a mobile communications system, the method comprising: determining whether a traffic path is needed to be relocated; detecting a terminal mode if a relocation of the traffic path is necessary; and sending a mode transition request to the terminal if the terminal is in an active mode or establishing an optimized traffic path if the terminal is in an inactive mode; wherein the inactive mode is at least one of a Quasi active mode and an Idle mode.

Further, the present invention provides a method performed by a terminal for relocating an access gateway (AG) in a mobile communications system, the method comprising: sending a request, to a target node B, for an optimized traffic path, during or after performing handover from a source Node B (NB) to a target node B, to the network that determines the optimized traffic path by, sending a relocation request from a target NB to a target access gateway; sending a path optimization request from the target access gateway to a source access gateway; sending a path switching request from at least one of the target access gateway and source access gateway to a higher entity; and establishing, by the higher entity, a optimized traffic path to transfer data; and receiving a data through the optimized traffic path from the network; wherein the sending step is performed if the terminal is in non-active mode; wherein the higher entity is a network node or an Inter-Autonomous System (Inter-AS).

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention is not intended to limit the scope of the present invention to a certain type of wireless communication system. The present invention is also applicable to other wireless communication systems using different air interfaces and/or physical layers, for example, TDMA, CDMA, FDMA, WCDMA, OFDM, EVDO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims

The invention claimed is:

1. A method for relocating a traffic transmission path during or after a handover process in a mobile communications system having network entities and at least one terminal, the method comprising:
sending an access gateway (AG) relocation request message from a target Node B to a target access gateway, wherein the AG relocation request message includes information related to the at least one terminal including authentication information, security information, compression-related information, service information, and Tracking Area (TA) information;
sending an AG path optimization request message from the target access gateway to a source access gateway, wherein the AG path optimization request message includes User Equipment (UE) context information, identification information, authentication information, and security information;
sending an AG path switching message from at least one of the target access gateway and the source access gateway to a higher entity;
establishing, by the higher entity, an optimized traffic transmission path between the at least one terminal and the higher entity,
wherein the higher entity is an Inter-Autonomous System (Inter-AS) located higher than an access gateway (AG),
wherein the higher entity determines the optimized traffic transmission path based upon a traffic load condition, and
wherein the traffic load condition is determined by a traffic overload situation, a user overload situation and a capacity of at least the source access gateway or the target access gateway;
sending an AG path optimization response message from the source access gateway to the target access gateway in response to the AG path optimization request message, wherein the AG path optimization response message includes authentication information and security information;
adding a terminal into a list of the target access gateway immediately after the AG path optimization response message is received from the source access gateway and/or removing a terminal from a list of the source access gateway immediately after the AG path optimization response message is received by the target access gateway; and re-establishing the optimized traffic transmission path when the higher entity determines that the traffic load condition has been substantially changed, wherein all the steps are performed when the terminal is in a Quasi-active mode.

2. The method of claim 1, further comprising:
receiving, by the target node B, a request from the at least one terminal for relocation during or after performing a handover from the source node B to the target node B.

3. The method of claim 2, wherein at least one of the source node B and the target node B is an enhanced Node B (eNB).

4. The method of claim 2, further comprising:
sending, by the target node B, network related information and/or system information to the at least one terminal.

5. The method of claim 4, wherein the network related information includes an identifier to define a domain and/or a node managed by a network.

6. The method of claim 1, wherein at least the source access gateway or the target access gateway includes information about the at least one terminal related to at least one of authentication information, security information, compression-related information, service information, or Tracking Area (TA) information.

7. The method of claim 1, further comprising:
sending a request to the at least one terminal for changing or maintaining a terminal state.

8. A method of relocating a traffic transmission path in a mobile communications system, the method comprising:
sending a request to a target Node B (NB) for an optimized traffic path to be determined by a network during or after performing a handover from a source NB to the target NB, comprising:
sending an access gateway (AG) relocation request message from the target NB to a target access gateway to determine the optimized traffic path, wherein the AG relocation request message includes information related to the at least one terminal including authentication information, security information, compression-related information, service information, and Tracking Area (TA) information;
sending an AG path optimization request message from the target access gateway to a source access gateway, wherein the AG path optimization request message includes User Equipment (UE) context information, identification information, authentication information, and security information;
sending an AG path switching message from at least the target access gateway or the source access gateway to a higher entity;
establishing, by the higher entity, the optimized traffic path to transfer data,
wherein the higher entity is an Inter-Autonomous System (Inter-AS) located higher than an access gateway (AG),
wherein the higher entity determines the optimized traffic transmission path based upon a traffic load condition, and
wherein the traffic load condition is determined by a traffic overload situation, a user overload situation and a capacity of at least the source access gateway or the target access gateway;
sending an AG path optimization response message from the source access gateway to the target access gateway in response to the AG path optimization request message, wherein the AG path optimization response message includes authentication information and security information; and
adding a terminal into a list of the target access gateway immediately after the AG path optimization response message is received from the source access gateway and/or removing a terminal from a list of the source access gateway immediately after the AG path optimization response message is received by the target access gateway;
re-establishing the optimized traffic transmission path when the higher entity determines that the traffic load condition has been substantially changed; and
receiving the data from the network through the optimized traffic path,
wherein all the steps are performed when the terminal is in a Quasi-active mode.

9. A mobile terminal for transmitting and receiving data through a traffic path in a mobile communications system, the mobile terminal comprising:
a transceiver adapted to transmit or receive data;
a memory adapted to store the data transmitted or received via the transceiver or from an external source; and
a processor cooperating with the transceiver and the memory and adapted to:
send a request to a target Node B (NB) during or after performing a handover from a source NB to the target NB for an optimized traffic path to be determined by a network such that the target NB sends an access gateway (AG) relocation request message to a target access gateway, the target access gateway sends an AG path optimization request message to a source access gateway, at least the target access gateway or the source access gateway sends an AG path switching message to a higher entity, the higher entity establishes the optimized traffic path to transfer data, wherein the higher entity is an Inter-Autonomous System (Inter-AS) located higher than an access gateway (AG), wherein the higher entity determines the optimized traffic transmission path based upon a traffic load condition, and wherein the traffic load condition is determined by a traffic overload situation, a user overload situation and a capacity of at least the source access gateway or the target access gateway; the source access gateway sends an AG path optimization response message to the target access gateway in response to the AG path optimization request message, and a terminal is added into a list of the target access gateway immediately after the AG path optimization response message is received from the source access gateway and/or the terminal is removed from a list of the source access gateway immediately after the AG path optimization response message is received by the target access gateway,
wherein the AG relocation request message includes information related to the at least one terminal including authentication information, security information, compression-related information, service information, and Tracking Area (TA) information,
wherein the AG path optimization request message includes User Equipment (UE) context information, identification information, authentication information, and security information,
wherein the AG path optimization response message includes authentication information and security information, and wherein the optimized traffic transmission path is re-established when the traffic load condition is substantially changed, and; and receive the data from the network through the optimized traffic path, wherein all the steps performed by the transceiver, the memory and the processor occur when the terminal is in a Quasi-active mode.

* * * * *